US009587754B2

(12) United States Patent
Cramer (10) Patent No.: US 9,587,754 B2
(45) Date of Patent: *Mar. 7, 2017

(54) ELECTRONIC FLOW SENSOR (71) Applicants: Toptron GmbH, Menden (DE);
Cavagna Group SpA., Viadana die Calvisano (BS) (IT)

(72) Inventor: Wilhelm Cramer, Menden (DE)

(73) Assignees: Toptron GmbH, Menden (DE);
Cavagna Group SpA., Viadana die Calvisano (BS) (IT)

( * ) Notice: Subject to any disclaimer, the term of this patent is extended or adjusted under 35 U.S.C. 154(b) by 171 days.

This patent is subject to a terminal disclaimer.

(21) Appl. No.: 14/175,390

(22) Filed: Feb. 7, 2014

(65) Prior Publication Data
US 2014/0150884 A1    Jun. 5, 2014

Related U.S. Application Data (63) Continuation of application No. 12/671,638, filed as application No. PCT/EP2008/006331 on Jul. 31, 2008, now Pat. No. 8,720,469.

(30) Foreign Application Priority Data

Aug. 1, 2007  (DE) ................. 10 2007 035 977

(51) Int. Cl.
  *F16K 17/36*  (2006.01)
  *F17C 13/04*  (2006.01)
  *F17C 13/12*  (2006.01)

(52) U.S. Cl.
  CPC ............ *F16K 17/36* (2013.01); *F17C 13/045* (2013.01); *F17C 13/123* (2013.01);
  (Continued)

(58) Field of Classification Search
  CPC .. F16K 17/36; F17C 13/045; Y10T 137/7761; Y10T 137/0753; Y10T 137/0777; Y10T 137/7727
  (Continued)

(56) References Cited

U.S. PATENT DOCUMENTS

| 4,223,692 A * | 9/1980 | Perry ................. F16K 17/30 |
| | | 137/460 |
| 4,839,790 A * | 6/1989 | Fujimoto .............. F16K 17/20 |
| | | 48/194 |

(Continued)

FOREIGN PATENT DOCUMENTS

| DE | 19522358 C1 | 1/1997 |
| DE | 196 43 801 A1 | 5/1998 |

(Continued)

OTHER PUBLICATIONS

G. Schmidt, "Grundlagen der Regelungstechnik", Grundlagen der Regelungstechnik, Springer verlag, pp. 34-35, (1982).

(Continued)

*Primary Examiner* — Matthew W Jellett
(74) *Attorney, Agent, or Firm* — Panitch Schwarze Belisario & Nadel LLP (57) ABSTRACT

A safety shut-off device is provided for a liquid gas system for vehicles and/or vehicle trailers, in order to avoid an inadvertent release of gas. The device includes an electromagnetic gas valve for supplying/shutting off the gas, an electronic unit for activating the electromagnetic gas valve, and a flow sensor for determining a current gas flow being discharged from a storage tank. Furthermore, the device includes an evaluation unit for comparing the current gas flow to a previous gas flow or to a gas flow which is indicated by the gas consumers and is to be expected. If, during use, the evaluation unit determines a current gas flow which differs by more than a maximum permissible rate of (Continued)

change from the previous gas flow or from an expected gas flow, the electromagnetic gas valve is activated via the electric unit in order to shut off the supply of gas.

47 Claims, 3 Drawing Sheets

(52) U.S. Cl.
CPC .. *F17C 2205/0332* (2013.01); *F17C 2221/01* (2013.01); *F17C 2221/03* (2013.01); *F17C 2223/0153* (2013.01); *F17C 2223/033* (2013.01); *F17C 2227/042* (2013.01); *F17C 2250/0443* (2013.01); *F17C 2250/0452* (2013.01); *F17C 2260/042* (2013.01); *F17C 2270/0168* (2013.01); *Y10T 137/0318* (2015.04); *Y10T 137/0368* (2015.04); *Y10T 137/0777* (2015.04); *Y10T 137/1842* (2015.04); *Y10T 137/7759* (2015.04); *Y10T 137/7761* (2015.04); *Y10T 137/8593* (2015.04)

(58) Field of Classification Search
USPC .................................................. 137/39, 487.5
See application file for complete search history.

(56) References Cited

U.S. PATENT DOCUMENTS

| | | | | |
|---|---|---|---|---|
| 4,928,728 A * | 5/1990 | Nakane | ................. | G01F 15/002 137/487.5 |
| 5,360,139 A | 11/1994 | Goode | | |
| 5,570,729 A | 11/1996 | Mutter | | |
| 5,673,735 A * | 10/1997 | Crvelin | ................. | F17C 13/045 137/256 |
| 5,694,960 A | 12/1997 | Turk et al. | | |
| 6,000,931 A * | 12/1999 | Tanabe | ................. | G01M 3/2807 431/22 |
| 7,077,741 B2 | 7/2006 | Brenner et al. | | |
| 7,484,521 B2 * | 2/2009 | Kimbara | ............... | F17C 13/025 137/487.5 |
| 7,562,668 B2 | 7/2009 | Mackay-Smith et al. | | |
| 7,809,514 B2 * | 10/2010 | Miyata | ..................... | G01F 1/66 702/45 |
| 8,386,084 B2 * | 2/2013 | Koba | ..................... | F23K 5/005 137/382 |
| 8,522,815 B2 * | 9/2013 | Honda | .................... | F23N 1/002 137/459 |
| 2002/0023645 A1 | 2/2002 | Zdrojkowski et al. | | |
| 2002/0026957 A1 | 3/2002 | Reyman | | |
| 2002/0117202 A1 | 8/2002 | Tinsley et al. | | |
| 2006/0076053 A1 | 4/2006 | McGill | | |
| 2008/0185049 A1 * | 8/2008 | Mulligan | ................. | F17D 5/06 137/382 |
| 2010/0170582 A1 * | 7/2010 | Koba | ..................... | F23K 5/005 137/487.5 |
| 2011/0259426 A1 | 10/2011 | Cramer | | |

FOREIGN PATENT DOCUMENTS

| | | |
|---|---|---|
| DE | 102 44 139 A1 | 4/2004 |
| DE | 60005849 T2 | 9/2004 |
| DE | 69534893 T2 | 9/2006 |
| DE | 10 2005 040 024 A1 | 3/2007 |
| EP | 0 653 585 A1 | 5/1995 |
| EP | 1 205 704 A1 | 5/2002 |
| EP | 1 356 973 A1 | 10/2003 |
| EP | 1 450 097 A2 | 8/2004 |
| JP | 59-187178 A | 10/1984 |
| JP | 2006-266384 A | 10/2006 |
| JP | 2006-283840 A | 10/2006 |

OTHER PUBLICATIONS

English Translation of Int'l Preliminary Report on Patentability issued on Nov. 19, 2009 in Int'l Application No. PCT/EP2008/006331.

Office Action issued Apr. 22, 2008 in DE Application No. 10 2007 035 977.4.

Office Action issued Aug. 14, 2013 in AU Application No. 2008282030.

\* cited by examiner

ELECTRONIC FLOW SENSOR

CROSS-REFERENCE TO RELATED APPLICATIONS

This application is a Continuation of pending U.S. patent application Ser. No. 12/671,638, filed Jul. 12, 2011, which is a Section 371 of International Application No. PCT/EP2008/006331, filed Jul. 31, 2008, which was published in the German language on Feb. 5, 2009, under International Publication No. WO 2009/015895 A1, the entire disclosures of all of which are incorporated by reference herein.

BACKGROUND OF THE INVENTION

The invention relates to a safety shut-off device for a liquid gas system having one or more gas consumers for vehicles and/or vehicle trailers for avoiding an unwanted release of gas. Such an arrangement is already known from German published patent application DE 10 2005 040 024 A1. In the safety shut-off device therein described, a gas supply is interrupted in case of an accident. An accident sensor is provided for this purpose which can be realized, for example, as an acceleration sensor and/or inclination sensor.

BRIEF SUMMARY OF THE INVENTION

The object of the present invention with respect to this prior art is to create a safety shut-off device which reliably shuts off a gas supply in case of accidents but also in other trouble situations.

This object is achieved by a safety shut-off device for a liquid gas system having one or more gas consumers for vehicles and/or vehicle trailers for avoiding an unwanted release of gas, comprising:

an electromagnetic gas valve for shutting off the gas supply;

an electronic unit for controlling the electromagnetic gas valve, a flow sensor for detecting a current gas flow $F_a$ being discharged from a gas reservoir;

an evaluation unit for comparing the current gas flow $F_a$ to a previous gas flow $F_v$, and an electronic unit which controls the electromagnetic gas valve for shutting off the gas supply when the evaluation unit detects a current gas flow $F_a$ which differs from the previous gas flow $F_v$ by more than a maximum admissible change rate $\Delta_{max}$.

Alternatively or additionally, the object is achieved by a safety shut-off device as above, in which the evaluation unit compares the current gas flow $F_a$ to an admissible maximum gas flow $F_{max}$; and in which the electronic unit controls the electromagnetic gas valve for shutting off the gas supply when the evaluation unit detects a current gas flow $F_a$ which is higher than the admissible maximum gas flow $F_{max}$.

A liquid gas system which integrates a safety shut-off device according to the present invention and a safety shut-off method for a liquid gas system are furthermore proposed.

A core idea of the present invention is to provide a flow sensor to determine a current gas flow exiting from a gas reservoir, and an evaluation unit to check this current gas flow for plausibility by criteria defined for the given liquid gas system. In a first embodiment, the given criterion depending on the configuration of the liquid gas system is a maximum admissible change rate $\Delta_{max}$ of the gas flow. In this case, the current gas flow is compared to a previous gas flow in an evaluation unit. As an alternative or in addition, an admissible maximum gas flow may be used as a criterion for judging the plausibility or safety of a current gas flow. The evaluation unit would in this case compare the current gas flow to an admissible maximum gas flow $F_{max}$.

A sampling frequency for detecting the current gas flow $F_a$ may, for example, be in the range of 10 to 200 times per minute. Such a sampling frequency may preferably be in the range of 30 to 120 times per minute, so that the time interval between one determination of the current gas flow and a previous gas flow is between 0.5 sec. and 5 sec. It is decisive to the inventively performed comparison $F_a-F_v>\Delta_{max}$ that, on the one hand, a change in flow caused, for example, by a line break has in fact occurred even when the line break occurs in a remote portion of the gas line, such that the detection and/or allowance intervals should not be selected to be too short while, on the other hand, an interval which is too long must also be prevented, so as to be able to shut off the gas supply as quickly as possible and prevent an unnecessary discharge of gas and to avoid an unintentional shut-off when various gas appliances are started up within a short time.

In both cases, an electronic unit is ultimately provided which controls the electro-magnetic gas valve for shutting off the gas supply when the evaluation unit has detected an inadmissible gas flow within the scope of the checking criterion. Hence, in the first alternative, the current gas flow $F_a$ differs from the previous gas flow $F_v$ by more than a maximum admissible change rate $\Delta_{max}$ or, in the second alternative, the current gas flow $F_a$ is higher than the admissible maximum gas flow $F_{max}$.

In a specifically preferred configuration, the maximum admissible change rate $\Delta_{max}$ is calculated according to the consumption of the largest gas consumer of the liquid gas system. Thus, even switching on the gas consumer having the largest gas consumption within the gas system shall not result in automatically shutting off the gas supply, so that the change rate occurring upon switching on this gas consumer has to be tolerated by the safety shut-off device without shutting off the gas supply.

In order to prevent unwanted shut-offs of the gas supply, the maximum admissible change rate $\Delta_{max}$ should be higher than the consumption value for the largest gas consumer $F_G$ by a defined tolerance value, wherein this tolerance value can be less than 30%, preferably less than 20% of the consumption value of the largest gas consumer.

With respect to the second variant, the admissible maximum gas flow $F_{max}$ is preferably calculated or oriented according to the sum of all the consumption values $F_s$ for the gas consumers of the liquid gas system.

Further preferred, a tolerance is provided here as well for avoiding unwanted shut-offs, so that the admissible maximum gas flow $F_{max}$ is higher than the sum of all the gas consumers $F_s$ of the liquid gas system by a tolerance value of, for example, less than 25%, preferably less than 15%.

Alternatively, it is also possible for the maximum admissible change rate $\Delta_{max}$ and/or the admissible maximum gas flow $F_{max}$ to be currently changed or adapted by current and/or expected gas consumption values signaled by the consumers. This information may be supplied to the evaluation unit and/or the electronic unit in order to determine whether there is a plausible or an implausible gas consumption. A shut-off may then take place when the gas consumption to be expected from the information of the gas consumers does not correspond to the gas consumption measured at the flow sensor. Of course, tolerances may appropriately be provided here as well. The information about current consumption values or gas consumption values to be expected from the respective gas consumers may be transmitted to the electronic unit or evaluation unit, in particular via a bus system.

In a preferred further embodiment, the evaluation unit may be in communication with an information output unit such as a display, in particular a screen/display or an inter-face for outputting one or more of the following items of information: current gas flow, gas flow integrated over a period of time, in particular gas flow integrated as of a change of bottles, currently available residual amount in a gas bottle or a gas reservoir; as well as an alarm indication upon falling below a predefined residual amount.

Moreover, an accident sensor which is in active communication with the evaluation unit and/or the electronic unit is provided in a possible configuration of a device according to the present invention to detect an accident befalling the vehicle and/or vehicle trailer, wherein the electronic unit controls the electromagnetic gas valve for shutting off the gas supply when notified by the accident sensor of an accident. In this respect, the safety shut-off device already known from prior art may, for example, be combined with the present safety shut-off device, in such a manner that the gas supply is shut off both upon response of the accident sensor as well as upon detection of a gas flow which is implausible according to the criteria of the specific liquid gas system. This configuration thus guarantees double the safety even in the case of a line break due to an accident, since in this case both the accident sensor would cause a shut-off of the gas supply and the gas flow would adopt an implausible value, so that an immediate shut-off would also take place as a result of the flow evaluation.

In a preferred configuration, the electromagnetic gas valve is constructed so as to close in the absence of an energy supply, hence shut off the gas supply in the liquid gas system.

The electromagnetic gas valve may be fluidically connected either downstream or upstream of a pressure regulator. The electromagnetic gas valve may also be mounted directly to the pressure regulator or the gas reservoir.

The electromagnetic gas valve and/or evaluation unit and/or electronic unit may be connected or connectable to a battery installed in the vehicle and/or vehicle trailer.

In a further preferred configuration, a switch preferably arranged inside the vehicle or vehicle trailer may be provided for manually switching the gas supply on or off.

The safety shut-off device according to embodiments of the present invention may generally still comprise one or more further sensors, in particular gas sensors and/or smoke detectors which detect further hazardous situations, in particular gas leakage and/or fire in the vehicle and/or vehicle trailer, wherein the sensors are in communication with the electronic unit for transmitting a danger signal.

In this respect, the electronic unit and/or sensors are preferably configured such that the electromagnetic gas valve automatically shuts off the gas supply in case of trouble.

Furthermore, a liquid gas system for vehicles and/or vehicle trailers is also proposed according to the present invention, in which one or more gas reservoirs are connected or connectable to one or more gas consumers via one or more gas lines, with a safety shut-off device for avoiding an unwanted release of gas, wherein the safety shut-off device comprises: an electromagnetic gas valve for shutting off the gas supply, an electronic unit for controlling the electromagnetic gas valve, a flow sensor for detecting a current gas flow being discharged from the gas reservoir, an evaluation unit for comparing the current gas flow $F_a$ to a previous gas flow $F_v$ and gas valve, and an electronic unit which controls the electromagnetic gas valve for shutting off the gas supply when the evaluation unit detects a current gas flow $F_a$ which differs from the previous gas flow $F_v$ by more than a maximum admissible change rate $\Delta_{max}$.

Another variant proposes a liquid gas system for vehicles and/or vehicle trailers in which one or more gas reservoirs are connected or connectable to one or more gas consumers via one or more gas lines, with a safety shut-off device for avoiding an unwanted release of gas, wherein the safety shut-off device comprises: an electro-magnetic gas valve for shutting off the gas supply, an electronic unit for controlling the electromagnetic gas valve, a flow sensor for detecting a current gas flow $F_a$ being discharged from the gas reservoir, an evaluation unit for comparing the current gas flow to an admissible maximum gas flow $F_{max}$, and an electronic unit which controls the electromagnetic gas valve for shutting off the gas supply when the evaluation unit detects a higher current gas flow $F_a$ than the admissible maximum gas flow $F_{max}$.

The two liquid gas systems cited above can also be combined with each other, in such a manner that a shut-off takes place both when the current gas flow $F_a$ differs from the previous gas flow $F_v$ by more than a maximum admissible change rate $\Delta_{max}$, as well as when the current gas flow $F_a$ is higher than an admissible maximum gas flow $F_{max}$.

Furthermore, corresponding methods are proposed for shutting off a liquid gas system having the features of one of the two liquid gas systems cited above, wherein in a first variant, a current gas flow $F_a$ exiting a gas source is detected, the current gas flow $F_a$ is compared to a previous gas flow $F_v$, and then when the current gas flow $F_a$ differs from the previous gas flow $F_v$ by more than a maximum admissible change rate $\Delta_{max}$, the gas supply is interrupted via an electromagnetically controlled gas valve. The other method variant provides for detecting the current gas flow $F_a$ exiting a gas source, the current gas flow $F_a$ being compared to an admissible maximum gas flow $F_{max}$, and then when the current gas flow $F_a$ is higher than the admissible maximum gas flow $F_{max}$, interrupting the gas supply via an electromagnetically controlled gas valve.

The two methods can also be combined with each other.

Furthermore, a preferred configuration of the two methods provides for interrupting the power supply to the electromagnetic gas valve in the liquid gas system, so as to shut off the gas supply.

The inventive method(s) may be configured in a first alternative, such that the maximum admissible change rate $\Delta_{max}$ and/or the admissible maximum gas flow $F_{max}$ are fixedly preset or pre-selected for a given configuration of the liquid gas system. In another configuration, it is possible for the maximum admissible change rate $\Delta_{max}$ and/or the admissible maximum gas flow $F_{max}$ to be adapted to the respective consumption situation; i.e., using the current gas consumption of the gas consumers, or the gas consumption to be expected from the gas consumers, to currently determine the maximum admissible change rate $\Delta_{max}$ and/or the admissible maximum gas flow $F_{max}$. In one specific configuration, the electronic unit may, for example, obtain from each of the gas consumers the information as to whether it is switched on or off, as well as the expected gas consumption amount, if necessary. The transmission of this information may take place via separate lines to each consumer or via a bus system.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. The invention will be explained below also with respect to further features and advantages using the description of exemplary embodiments and with reference to the attached drawings. In the drawings.

DETAILED DESCRIPTION OF THE INVENTION

Figure 1:
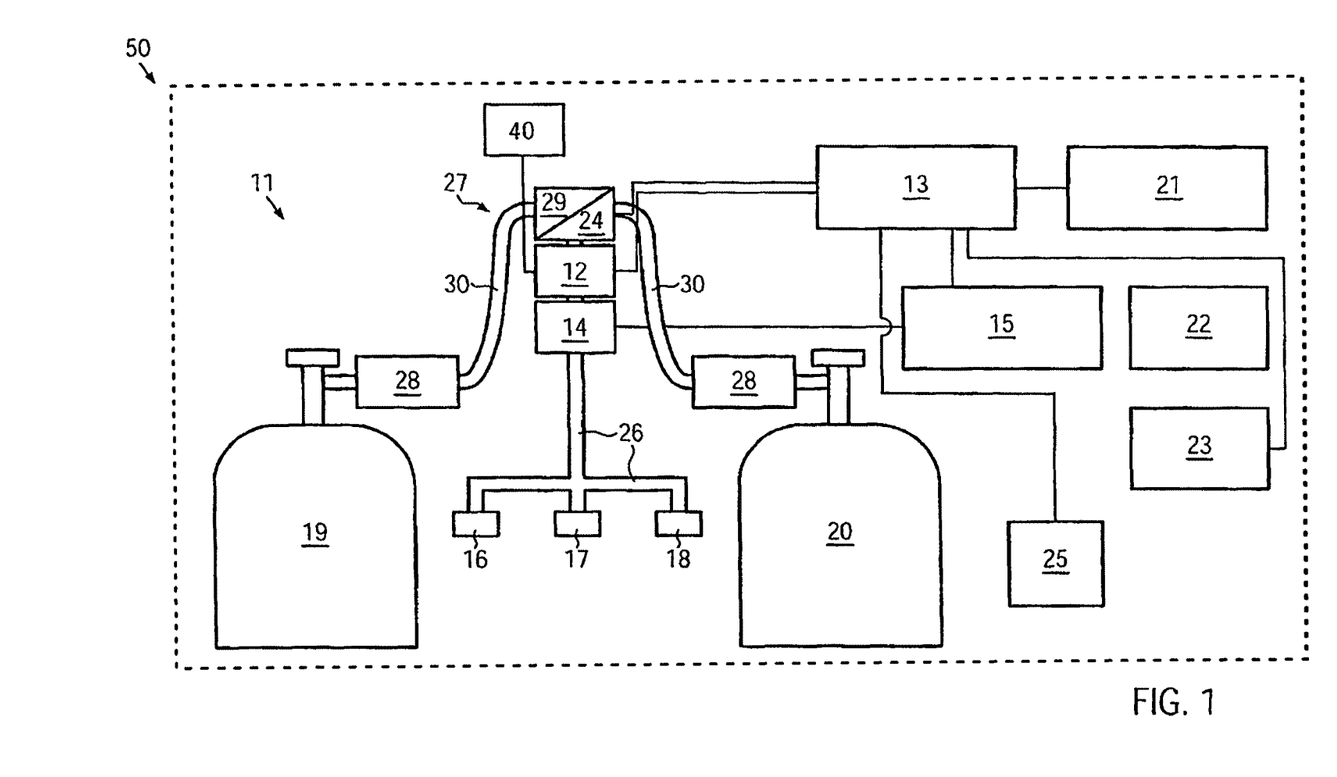
FIG. 1 is a schematic diagram of one embodiment of the inventive safety shut-off device and the inventive liquid gas system.

A basic set-up of a liquid gas system for a vehicle and/or vehicle trailer 50, including one embodiment of an inventive safety shut-off device 27, is illustrated in FIG. 1. The liquid gas system 11 first comprises two gas reservoirs 19, 20 connected via feed lines 30 to a changeover switch 29 concurrently integrating a pressure regulator 24. In addition, a hose rupture protection 28 may in each case be arranged within the feed lines 30. The changeover switch 29 works as follows: when two full gas reservoirs 19, 20 are connected, the changeover switch 29 is adjusted so that gas is withdrawn from the preselected gas reservoir. When this gas reservoir runs empty, the changeover switch 29 automatically switches over to the second full gas reservoir.

The changeover switch 29 in the present embodiment automatically switches from the empty to the full gas reservoir (and may also be controllable by an electronic unit 13 still to be mentioned), so that gas can be selectively withdrawn from either gas reservoir 19 or gas reservoir 20. In most cases of application, it would be reasonable to first empty a first gas reservoir and then switch over to the second gas reservoir.

Which gas reservoir is currently selected may also be output via an information output unit 21, e.g., a display screen.

The gas is conducted via gas lines 26 to a plurality of gas consumers 16 to 18 by the changeover switch 29 or by the pressure regulator 24. Immediately downstream of the changeover switch 29, an electromagnetic gas valve 12 with a downstream flow sensor 14 is provided. The electromagnetic gas valve is configured so as to interrupt a gas flow to the gas consumers 16 to 18, this preferably taking place by interrupting a power supply, such as a battery 40 installed in the vehicle and/or vehicle trailer 50, for the electromagnetic gas valve 12. In this respect, the electromagnetic gas valve 12 remains open as long as a predetermined electric potential is provided. If this electric potential decreases or is 0, the electromagnetic gas valve closes and interrupts the gas supply to the plurality of gas consumers 16 to 18.

The flow sensor 14 is capable of detecting a current gas flow $F_a$ to the gas consumers 16 to 18. The current gas flow $F_a$ is thereby transmitted to an evaluation unit 15. In this embodiment, the evaluation unit 15 compares the current gas flow $F_a$ both to an admissible maximum gas flow $F_{max}$, calculated from the sum of all the consumption values $F_s$ for the gas consumers 16 to 18 of the liquid gas system, as well as to a previous gas flow F. For this purpose, the respectively sampled current gas flow $F_a$ is stored in the evaluation unit, so that it is available to the next polling cycle as the previous gas flow $F_v$. In the present embodiment, the current gas flow $F_a$ is thus simultaneously subjected to two plausibility tests, namely whether it is higher than the total admissible maximum gas flow $F_{max}$ on the one hand and, on the other hand, whether a maximum admissible change rate $\Delta_{max}$ is exceeded as compared to a previous gas flow F. If one of these two cases is present, i.e., the evaluation unit assesses a current gas flow $F_a$ seeming implausible under the criteria of the liquid gas system 11, a closing or error signal is transmitted to an electronic unit 13, which brings the electromagnetic gas valve 12 into a closed position. Specifically, the electronic unit 13 would in this case interrupt the power supply for the electro-magnetic gas valve 12, so that the latter closes automatically. The electronic unit 12 and the evaluation unit 15 are preferably also in active communication with the information output unit 21, such that the data acquired by the evaluation unit 15 can be output as processed data, as need be, and the current states of the liquid gas system are displayed, such as the current gas flow $F_a$, a previous gas low $F_v$, the defined system parameters $\Delta_{max}$ and $F_{max}$, the consumption value for the largest gas consumer $F_G$, the sum of all the consumption values for the gas consumers of the liquid gas system $F_s$, a gas consumption which has occurred since the last change of bottles, a residual amount of gas in the respective current gas reservoir, as well as further information and/or any desired subcombinations thereof.

The safety shut-off device 27 illustrated here merely as an example further comprises two accident sensors as a facultative arrangement, or for further increasing safety, namely an acceleration sensor 22 and an inclination sensor 23, so that an accident may be concluded from a response of at least one of the two sensors, and this information also effects a closing of the electromagnetic gas valve 12 in the electronic unit 13 by interrupting the power supply.

Finally, a manual switch 25 may further be provided, e.g., in the interior of the vehicle or vehicle trailer 50, which, for example, likewise causes a closing of the electromagnetic gas valve by the electronic unit 13 interrupting the power supply to the electro-magnetic gas valve 12. The changeover switch 29 cited above can also be connected to the electronic unit 13 so that the electronic unit 13 receives a signal from the changeover switch 29 indicating that a changeover has occurred and a corresponding display or evaluation may take place.

Figure 1A:
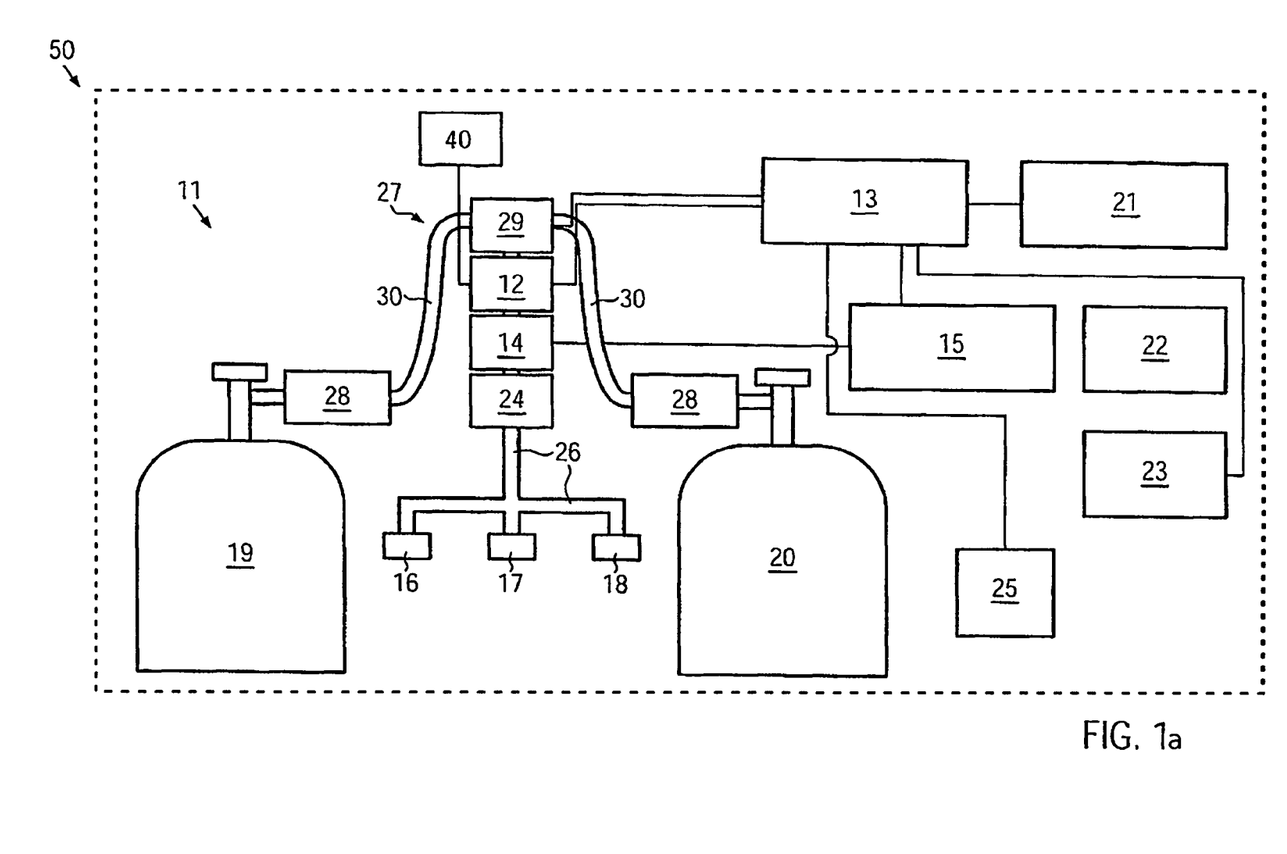
FIG. 1a is a schematic diagram of another embodiment of the inventive safety shut-off device and the inventive liquid gas system.

FIG. 1a discloses an embodiment of the safety shut-off device 27 that is very similar to the one shown in FIG. 1, with the difference being that the electromagnetic gas valve 12 is shown fluidically connected upstream of the pressure regulator 24.

Figure 2:
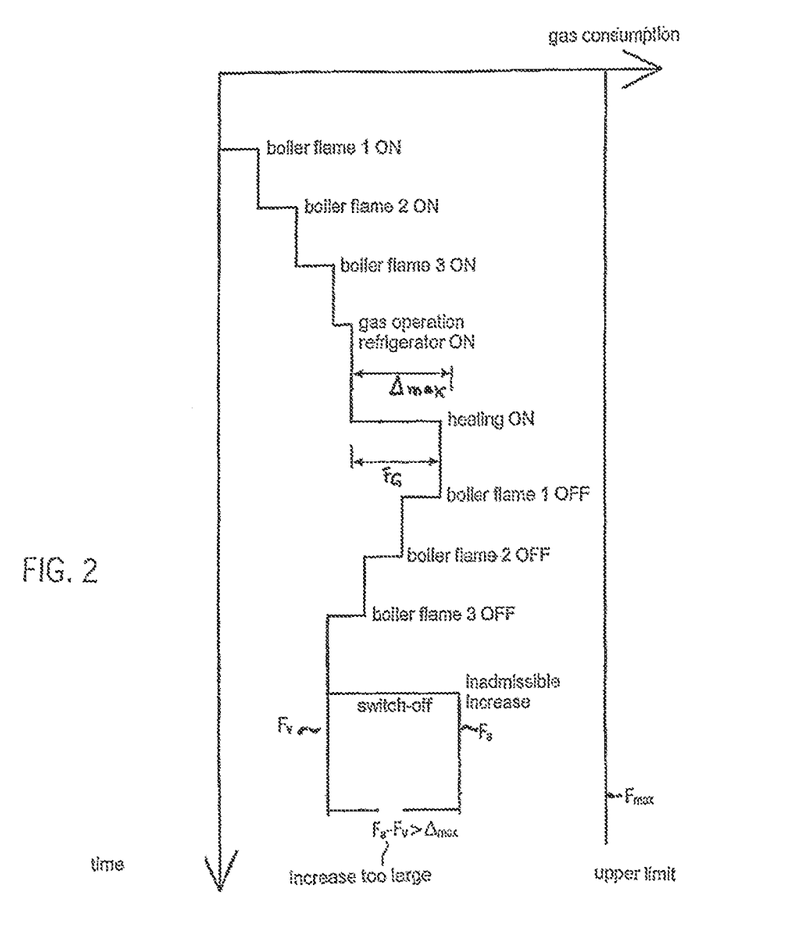
FIG. 2 is a flow chart of the current gas flow over a given period of time for a liquid gas system such as that shown in FIG. 1.

For mere illustrative purposes, a possible gas consumption over time is depicted in FIG. 2, wherein an increase in the current gas flow $F_a$ as compared to a previous gas flow $F_v$ has taken place as the last event, the increase being above a maximum admissible change rate $\Delta_{max}$, so that a shut-off of the electromagnetic gas valve 12 is thereby effected via the evaluation unit 15 and the electronic unit 13.

The safety shut-off device 27 thus shuts off the gas supply when $F_a - F_v > \Delta_{max}$ (first alternative of an implausible gas consumption)

or $F_a > F_{max}$ (second alternative of an implausible gas consumption).

As already mentioned several times above, only one of the two plausibility tests need be performed according to the invention. Preferably, both of the plausibility tests are performed, and a shut-off is effected upon even just one of the plausibility tests returning an implausible gas consumption.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A safety shut-off device for a liquid gas system having at least one gas consumer for a vehicle and/or vehicle trailer for avoiding an unwanted release of gas, the device comprising:
   a) an electromagnetic gas valve for shutting off a gas supply to the liquid gas system;
   b) a flow sensor for periodically detecting a current gas flow $F_a$ being discharged from a gas source;
   c) an evaluation unit that, for each time a current gas flow $F_a$ is detected by the flow sensor, compares the current gas flow $F_a$ to an immediately preceding detected gas flow $F_v$; and
   d) an electronic unit which controls the electromagnetic gas valve for shutting off the gas supply when the evaluation unit detects a current gas flow $F_a$ which differs from the immediately preceding detected gas flow $F_v$ by more than a maximum admissible gas flow change rate $\Delta_{max}$, such that the gas supply is shut off when the following condition is fulfilled: $F_a - F_v > \Delta_{max}$.

2. The safety shut-off device according to claim 1, wherein the maximum admissible gas flow change rate $A_{max}$ is calculated according to a consumption value of a largest gas consumer of the liquid gas system.

3. The safety shut-off device according to claim 2, wherein the maximum admissible gas flow change rate $\Delta_{max}$ is higher than the consumption value for the largest gas consumer $F_G$ by a tolerance value of less than 30%.

4. The safety shut-off device according to claim 1, wherein the maximum admissible gas flow change rate $\Delta_{max}$ is adjustable based on current gas flow consumption information of the gas consumers.

5. The safety shut-off device according to claim 4, wherein the electronic unit obtains from each of the gas consumers information regarding whether the respective gas consumer is switched on or off, as well as an expected gas consumption amount for the respective gas consumer.

6. The safety shut-off device according to claim 5, wherein the information is obtained by the electronic unit via a bus system.

7. The safety shut-off device according to claim 1, wherein the evaluation unit is in active communication with an information output unit for outputting at least one of the following items of information:
   the current gas flow;
   gas flow integrated over a period of time;
   gas flow integrated over time since a replacement of a gas bottle;
   a currently available residual amount in a gas bottle or a gas reservoir; and
   an alarm indication upon falling below a predefined residual amount.

8. The safety shut-off device according to claim 1, wherein the electromagnetic gas valve shuts off the gas supply in the liquid gas system in absence of an electrical energy supply.

9. The safety shut-off device according to claim 1, wherein the electromagnetic gas valve is gas-fluidically connected downstream of a pressure regulator.

10. The safety shut-off device according to claim 9, wherein the electromagnetic gas valve is directly mounted to the pressure regulator.

11. The safety shut-off device according to claim 9, wherein the pressure regulator is directly mounted or mountable to a gas reservoir constituting the gas source.

12. The safety shut-off device according to claim 1, wherein the electromagnetic gas valve is gas-fluidically connected upstream of a pressure regulator.

13. The safety shut-off device according to claim 12, wherein the electromagnetic gas valve is directly mounted or mountable to a gas reservoir constituting the gas source.

14. The safety shut-off device according to claim 12, wherein the electromagnetic gas valve is directly mounted to the pressure regulator.

15. The safety shut-off device according to claim 1, wherein the electromagnetic gas valve is connected or connectable to a battery installed in the vehicle and/or vehicle trailer.

16. The safety shut-off device according to claim 1, further comprising a switch optionally arranged in an interior of the vehicle or vehicle trailer for manually switching off the gas supply.

17. The safety shut-off device according to claim 1, further comprising at least one hazard sensor to detect a hazardous situation in the vehicle and/or vehicle trailer, wherein the at least one hazard sensor is in communication with the electronic unit for transmitting a danger signal.

18. The safety shut-off device according to claim 17, wherein the electronic unit and/or at least hazard sensor is configured such that the electromagnetic gas valve automatically shuts off the gas supply in case of hazard.

19. A liquid gas system for vehicles and/or vehicle trailers, the system comprising:
   a) at least one gas reservoir connected or connectable to at least one gas consumer via at least one gas line; and
   b) a safety shut-off device according to claim 1 for avoiding an unwanted release of gas.

20. A method for operating a safety shut-off of a liquid gas system for vehicles and/or vehicle trailers for avoiding an unwanted release of gas, the system including at least one gas reservoir connected or connectable to at least one gas consumer via at least one gas line, and a safety shut-off device, the safety shut-off device including an electromagnetic gas valve for shutting off a gas supply to the liquid gas system, a flow sensor for periodically detecting a current gas flow $F_a$ being discharged from the at least one gas reservoir, an evaluation unit that, for each time a current gas flow $F_a$ is detected by the flow sensor, compares the current gas flow $F_a$ to an immediately preceding detecting gas flow $F_v$, and an electronic unit which controls the electromagnetic gas valve for shutting off the gas supply, the method comprising the following steps:
   a) detecting, using the flow sensor, a current gas flow $F_a$ exiting the gas source;
   b) comparing, using the evaluation unit, the current gas flow $F_a$ to a previous gas flow; and
   c) interrupting, using the electronic unit, the gas supply via the electromagnetically controlled gas valve when the comparing step finds the current gas flow $F_a$ differs from the immediately preceding detected gas flow $F_v$ by more than a maximum admissible gas flow change rate $\Delta_{max}$, such that the gas supply is interrupted when the following condition is fulfilled: $F_a - F_v > \Delta_{max}$.

21. The method according to claim 20, wherein step a) occurs following an accident befalling the vehicle and/or vehicle trailer.

22. The method according to claim 20, wherein the step of interrupting the gas supply comprises interrupting a power supply to the electromagnetic gas valve to shut off the liquid gas system.

23. The method according to claim 20, wherein the maximum admissible gas flow change rate $\Delta_{max}$ is fixedly preselected for or adapted to at least one of the following: a given configuration of the liquid gas system, a current consumption situation, and a consumption situation to be expected, while the liquid gas system is in operation.

24. The safety shut-off device according to claim 17, wherein the at least one hazard sensor is a gas sensor and/or smoke detector to detect gas leakage and/or fire.

25. A safety shut-off device for a liquid gas system having at least one gas consumer for a vehicle and/or vehicle trailer for avoiding an unwanted release of gas, the device comprising:
   a) an electromagnetic gas valve for shutting off a gas supply to the liquid gas system;
   b) a flow sensor for periodically detecting a current gas flow $F_a$ being discharged from a gas source;
   c) an evaluation unit that, for each time a current gas flow $F_a$ is detected by the flow sensor, compares the current gas flow $F_a$ to an admissible maximum gas flow $F_{max}$; and
   d) an electronic unit which controls the electromagnetic gas valve for shutting off the gas supply when the evaluation unit detects a current gas flow $F_a$ which is higher than the admissible maximum gas flow $F_{max}$, wherein the admissible maximum gas flow $F_{max}$ is calculated according to a sum of all gas flow consumption values $F_s$ of the gas consumers of the liquid gas system, and wherein the admissible maximum gas flow $F_{max}$ is updated by current and/or expected gas consumption values signaled by the gas consumers.

26. The safety shut-off device according to claim 25, wherein the admissible maximum gas flow $F_{max}$ is higher than the sum of all the consumption values $F_s$ of the gas consumers of the liquid gas system by a tolerance value of less than 25%.

27. The safety shut-off device according to claim 25, wherein the admissible maximum gas flow $F_{max}$ is adjustable based on current gas flow consumption information of the gas consumers.

28. The safety shut-off device according to claim 27, wherein the electronic unit obtains from each of the gas consumers information regarding whether the respective gas consumer is switched on or off, as well as an expected gas consumption amount for the respective gas consumer.

29. The safety shut-off device according to claim 28, wherein the information is obtained by the electronic unit via a bus system.

30. The safety shut-off device according to claim 25, wherein the evaluation unit is in active communication with an information output unit for outputting at least one of the following items of information:
   the current gas flow;
   gas flow integrated over a period of time;
   gas flow integrated over time since a replacement of a gas bottle;
   a currently available residual amount in a gas bottle or a gas reservoir; and
   an alarm indication upon falling below a predefined residual amount.

31. The safety shut-off device according to claim 25, wherein the electromagnetic gas valve shuts off the gas supply in the liquid gas system in absence of an electrical energy supply.

32. The safety shut-off device according to claim 25, wherein the electromagnetic gas valve is gas-fluidically connected downstream of a pressure regulator.

33. The safety shut-off device according to claim 32, wherein the electromagnetic gas valve is directly mounted to the pressure regulator.

34. The safety shut-off device according to claim 32, wherein the pressure regulator is directly mounted or mountable to a gas reservoir constituting the gas source.

35. The safety shut-off device according to claim 25, wherein the electromagnetic gas valve is gas-fluidically connected upstream of a pressure regulator.

36. The safety shut-off device according to claim 35, wherein the electromagnetic gas valve is directly mounted or mountable to a gas reservoir constituting the gas source.

37. The safety shut-off device according to claim 35, wherein the electromagnetic gas valve is directly mounted to the pressure regulator.

38. The safety shut-off device according to claim 25, wherein the electromagnetic gas valve is connected or connectable to a battery installed in the vehicle and/or vehicle trailer.

39. The safety shut-off device according to claim 25, further comprising a switch optionally arranged in an interior of the vehicle or vehicle trailer for manually switching off the gas supply.

40. The safety shut-off device according to claim 25, further comprising at least one hazard sensor to detect a hazardous situation in the vehicle and/or vehicle trailer, wherein the at least one hazard sensor is in communication with the electronic unit for transmitting a danger signal.

41. The safety shut-off device according to claim 40, wherein the electronic unit and/or at least hazard sensor is configured such that the electromagnetic gas valve automatically shuts off the gas supply in case of hazard.

42. A liquid gas system for vehicles and/or vehicle trailers, the system comprising:
   a) at least one gas reservoir connected or connectable to at least one gas consumer via at least one gas line; and
   b) a safety shut-off device according to claim 25 for avoiding an unwanted release of gas.

43. A method for operating a safety shut-off of a liquid gas system for vehicles and/or vehicle trailers for avoiding an unwanted release of gas, the system including at least one gas reservoir connected or connectable to at least one gas consumer via at least one gas line, and a safety shut-off device, the safety shut-off device including an electromagnetic gas valve for shutting off a gas supply to the liquid gas system, a flow sensor for periodically detecting a current gas flow $F_a$ being discharged from the at least one gas reservoir, an evaluation unit that, for each time a current gas flow $F_a$ is detected by the flow sensor, compares the current gas flow $F_a$ to an admissible maximum gas flow $F_{max}$ that is calculated according to a sum of all gas flow consumption values $F_s$ of the gas consumers of the liquid gas system, and an electronic unit which controls an electromagnetically controlled gas valve for shutting off the gas supply, the method comprising the following steps:

a) detecting, using the flow sensor, a current gas flow $F_a$ exiting the gas source;
b) comparing, using the evaluation unit, the current gas flow $F_a$ to an admissible maximum gas flow $F_{max}$; and
c) interrupting, using the electronics unit, the gas supply via an electromagnetically controlled gas valve when the comparing step finds the current gas flow is greater than the admissible maximum gas flow $F_{max}$, and wherein the admissible maximum gas flow $F_{max}$ is updated by current and/or expected gas consumption values signaled by the gas consumers.

44. The method according to claim 43, wherein wherein step a) occurs following an accident befalling the vehicle and/or vehicle trailer.

45. The method according to claim 43, wherein the step of interrupting the gas supply comprises interrupting a power supply to the electromagnetic gas valve to shut off the liquid gas system.

46. The method according to claim 43, wherein the admissible maximum gas flow $F_{max}$ is fixedly preselected for or adapted to at least one of the following: a given configuration of the liquid gas system, a current consumption situation, and a consumption situation to be expected, while the liquid gas system is in operation.

47. The safety shut-off device according to claim 40, wherein the at least one hazard sensor is a gas sensor and/or smoke detector to detect gas leakage and/or fire.

* * * * *